UNITED STATES PATENT OFFICE.

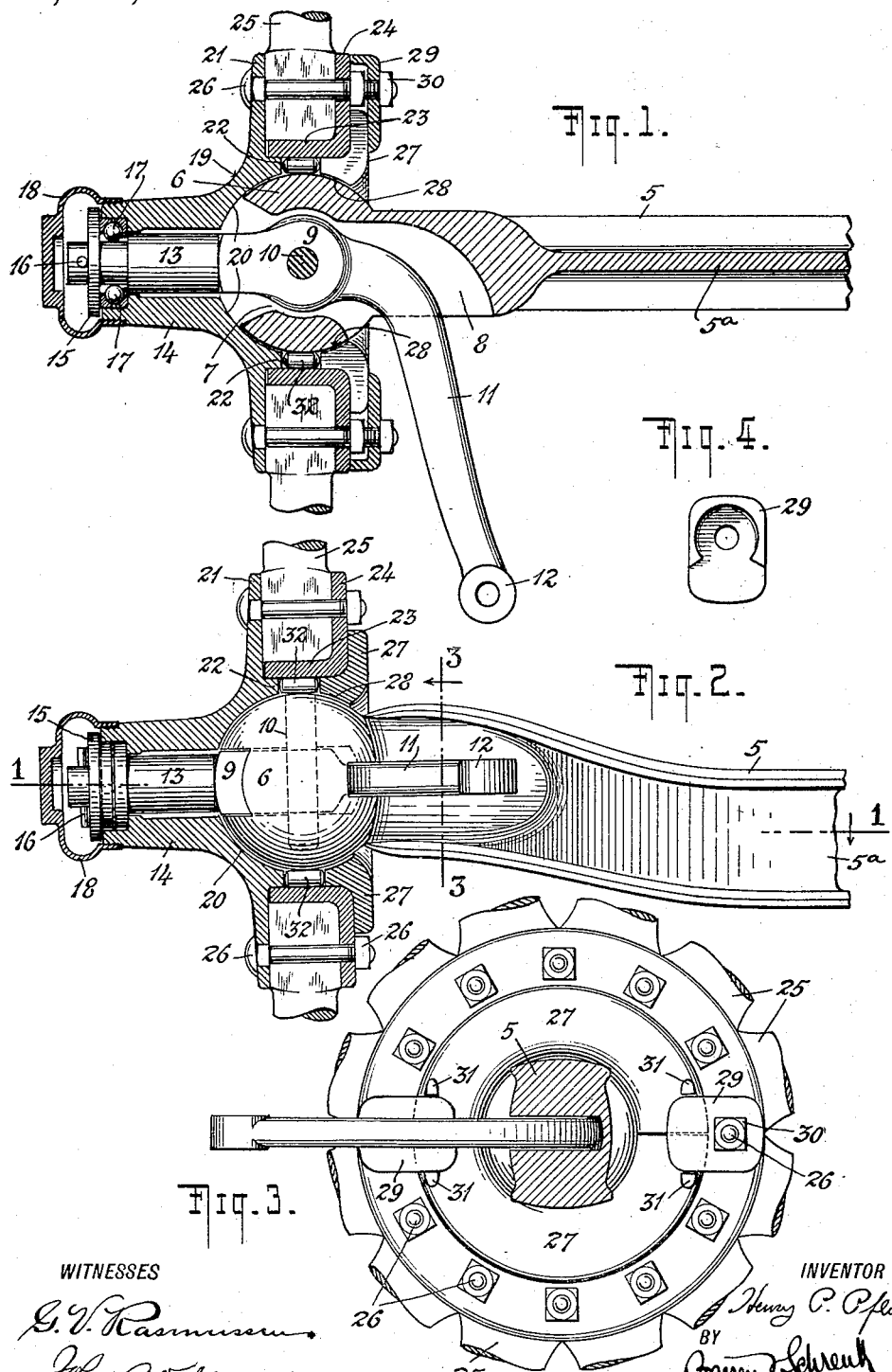

HENRY P. PFLUM, OF NEW YORK, N. Y.

VEHICLE.

1,205,476.

Specification of Letters Patent.

Patented Nov. 21, 1916.

Application filed February 1, 1916. Serial No. 75,513.

*To all whom it may concern:*

Be it known that I, HENRY P. PFLUM, a citizen of the United States, and resident of the borough of Brooklyn, county of Kings, city and State of New York, have invented certain new and useful Improvements in Vehicles, of which the following is a specification.

My invention relates to vehicles and more particularly to those of the self-propelled type such as automobiles and the like and has for its object to improve the running gear thereof by providing an efficient and simplified front wheel and axle construction in which the danger of breakage under strain is reduced to a minimum.

Other objects of my improvement will appear from the description hereinafter and the features of novelty will be pointed out in the appended claims.

In the accompanying drawings which illustrate an example of my improvement, Figure 1 is a horizontal section on the line 1—1 of Fig. 2 showing parts of the axle and of one wheel; Fig. 2 is an elevation partly in section; Fig. 3 is a cross-section on the line 3—3 of Fig. 2 and Fig. 4 is a detail face view of one of the elements of my invention.

As shown in said drawings the front axle 5 is formed with a spherical end or head 6 provided with a horizontally disposed slot 7 which at one end merges into a recess 8 formed in the web 5ª of the axle 5, it being understood that the said web is thickened for this purpose as indicated and further that the construction shown in the illustration is duplicated at the opposite end of the axle 5. The said slot 7 is adapted to accommodate a bearing 9 rotatably secured therein by means of a pin or the like 10 extending through the spherical head 6 so as to form a substantially vertical axis or pivot about which the bearing 9 is capable of being pivotally moved as will be hereinafter more fully set forth. The said bearing 9 is preferably formed in one piece with a lever 11 which projects out through the slot 7 and out of the recess 8 as shown in Fig. 1 and terminates in an apertured head 12 whereby the levers 11 at opposite ends of the axle 5 are arranged to be operatively connected with each other and with the steering mechanism in the customary manner. The said bearing 9 is further continued to form a spindle 13 which projects out through the outer end of the slot 7 and forms a bearing for the hub 14, secured thereon against axial displacement in any suitable manner as by means of a disk 15 held in place by a removable pin 16 or in any other convenient way. Ball bearings and suitable races 17 may be included in the arrangement to reduce friction and a protecting cap 18 may be removably connected with said hub 14 as shown. The latter is continued to form a portion 19 shaped at 20 to fit the surface of the spherical head 6 and itself in turn continued to form a flange 21 as shown in Figs. 1 and 2, said portion 19 being further provided with an internal annular shoulder 22. The latter forms a support for one edge of an annular member 23 having an axis common to that of the hub 14 and a peripheral flange 24 which together with the flange 21 forms an annular channel in which the spokes 25 of the wheel are clamped by means of bolts and nuts 26. The construction further comprises complementary ring sections 27 which fit into the annular member 23 and are provided with curved surfaces 28 fitting the surface of the spherical head 6 and which, with the surface 20 of the portion 19 serves as a bearing for maintaining the wheel in operative position upon the spherical head 6. The said ring sections 27 may be secured to the wheel in any suitable manner as by means of clamps 29 located upon two of the bolts 26 over the nuts thereof and extending radially inward to bridge the joints between the ring sections 27 as shown in Fig. 3. It will be understood that two of the bolts 26 are of relatively increased length to accommodate said clamps 29, the latter being secured in operative positions by means of auxiliary nuts 30 arranged to screw upon the projecting ends of said bolts 26. If necessary any suitable additional means may be provided to prevent circumferential creeping of the ring sections 27 relatively to the remainder of the wheel, the illustrated example showing said ring sections provided with projections 31 adapted to engage the clamps 29 for this purpose. The arrangement may further include roller or other bearings 32 located in the annular channel formed between the annular shoulder 22 and the ring sections 27 and engaging the spherical head 6 and the annular member 23 as shown in Figs. 1 and 2.

It will be noted that the hub 14, portions 19, member 23, flange 24, spokes 25 together with the usual rim of the wheel which has been omitted from the illustration, form a unit which is capable of being placed upon the spindle 13 and spherical end 5 and secured against axial displacement by means of the disk 15 and pin 16 and the ring sections 27 and clamps 29. To remove the wheel it is simply necessary to remove the clamps 29 and ring sections 27 and to detach the pin 16 and disk 15 after which the said wheel may be easily slipped from the spindle 13 and spherical head 6 as will be apparent from the drawings. It will of course, be understood, if the protecting cap 18 or its equivalent forms a part of the construction that the same must be removed to permit access to the disk 15 and pin 16 or their equivalents.

It will be seen that a pivotal movement of the lever 11 and bearing 9 upon the pin 10 will swing the spindle in a horizontal plane and thus similarly move the hub 14 and cause the portion 19 and ring sections 27 to move about the spherical head 6 as a bearing with the result that the entire wheel is adjusted in a horizontal plane relatively to the axle 5 to cause the vehicle to travel in a given direction or to change its direction of travel. It will be understood that this adjustment is simultaneous in both front wheels and further that it may be accomplished in the usual manner by means of the customary steering wheel. During the adjustment of the wheels as well as at all other times the major portion of the strains and stresses to which the wheel may be subjected is taken up by the spherical heads 6 and transferred thereby directly to the axle 5, these elements comprising a single unit. The spindle 13 is under comparatively no strain excepting during the actual adjustment of the wheels from one position to another and at such times is subjected to only the minimum strain necessary to shift the wheels as will be readily apparent. As shown in the drawings the slot 7 and recess 8 are so shaped as to permit the necessary movement of the parts when an adjustment of the wheels is desired or necessary. The said adjustable wheels, which usually are the front wheels of a vehicle, are thus easily movable to different positions as required and yet are operatively connected with the axle in an efficient and simple manner. The spherical head 6 forms a maximumly effective bearing for the wheel in all of its positions and movements and being formed integral with the axle 5 is adapted to efficiently take up all strains to which the vehicle wheels may be subjected and in fact is as strong as the strongest part of the axle itself. The pin 10 itself is held in the spherical head 6 against displacement by the wheel, it being apparent that as the latter rotates any tendency of said pin to move in the direction of its length will be counteracted by said wheel, more specifically by the roller bearings 32. The usual weak and more or less easily ruptured or injured elements in the connection between the front wheels and the front axle are thus avoided and an arrangement having the same or a greater degree of strength than the usual rear axle and wheel construction is secured.

It will be apparent that the illustrated improvement with slight modifications may be readily adapted for arrangements in which the wheels have no operative movement other than a rotary one relatively to the axle.

My improvement is simple in construction, easy to assemble and operate and needs no careful adjustment or attention and may be utilized in any type of vehicle but is specially adapted for use in connection with automobiles.

Various changes in the specific construction shown and described may be made within the scope of the claims without departing from the spirit of my invention.

I claim:

1. In a vehicle, the combination of an axle, a spherical head at an end of said axle, a spindle projecting beyond said spherical head, a wheel having a hub portion surrounding said spindle and journaled on said spherical head and means for preventing an axial movement of said wheel relatively to said head and spindle.

2. In a vehicle, the combination of an axle, a spherical head formed at an end of said axle, a wheel journaled on said head and means movable in the arc of a circle having said head as a center whereby said wheel is adjusted in a horizontal plane relatively to said axle.

3. In a vehicle, the combination of an axle, a spherical head formed integrally with said axle at an end thereof, a spindle movably connected with said head, a wheel having a hub portion surrounding said spindle and journaled on said head, and means for moving said spindle in an arc having the spherical head as a center.

4. In a vehicle, the combination of an axle, a spherical head formed integrally with said axle at an end thereof, and having a horizontally disposed slot, means pivotally mounted in said slot and projecting from opposite ends thereof, and a wheel having a hub portion journaled on said spherical head and operatively connected with said means.

5. In a vehicle, the combination of an axle having a recess near an end thereof, a spherical head formed integrally with said axle at an end thereof and provided with a horizontally disposed slot communicating with said recess, a bearing pivoted in said slot about a substantially vertical pivot, a spindle projecting from said bearing and out of the outer end of said slot, a wheel having a hub portion surrounding said spindle and journaled on said head and a lever projecting from said bearing and out of the inner end of said slot and out of said recess.

6. In a vehicle, the combination of an axle, a spherical head formed at an end thereof, a wheel journaled on said head and pivoted means extending through said head operatively connected with said wheel whereby the latter is adjustable relatively to said axle to steer the vehicle.

In testimony whereof I have hereunto set my hand.

HENRY P. PFLUM.

Copies of this patent may be obtained for five cents each, by addressing the "Commissioner of Patents, Washington, D. C."